(12) United States Patent
Kasuya et al.

(10) Patent No.: US 6,793,055 B2
(45) Date of Patent: Sep. 21, 2004

(54) TORQUE CAM MECHANISM AND POWER TRANSMISSION SYSTEM FOR FOUR-WHEEL DRIVE VEHICLE

(75) Inventors: Tomoaki Kasuya, Saitama (JP); Kentaro Arai, Saitama (JP); Kazuhiro Wada, Saitama (JP); Kenichiro Hayashi, Saitama (JP); Ryuichi Murakami, Saitama (JP); Katsuhiro Kitamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/289,269

(22) Filed: Nov. 7, 2002

(65) Prior Publication Data

US 2003/0085090 A1 May 8, 2003

(30) Foreign Application Priority Data

Nov. 8, 2001 (JP) .................................... P. 2001-343610

(51) Int. Cl.[7] .............................................. F16D 47/00
(52) U.S. Cl. .................... 192/35; 192/70.23; 192/93 A; 192/54.52; 192/85 CA; 180/247
(58) Field of Search ...................... 192/35, 54.5, 70.23, 192/85 CA, 93 A, 93 R, 103 F, 54.52; 180/247

(56) References Cited

U.S. PATENT DOCUMENTS

| | | | |
|---|---|---|---|
| 4,895,051 A | | 1/1990 | Weiss et al. |
| 5,244,056 A | * | 9/1993 | Hamada et al. ............. 180/247 |
| 5,464,084 A | * | 11/1995 | Aoki et al. .................... 192/35 |
| 5,720,375 A | | 2/1998 | Maeda et al. |
| 6,422,365 B2 | * | 7/2002 | Arai et al. ..................... 192/35 |
| 6,454,068 B2 | * | 9/2002 | Arai et al. ..................... 192/35 |
| 6,571,928 B1 | * | 6/2003 | Gassmann ................ 192/93 A |

FOREIGN PATENT DOCUMENTS

| | | |
|---|---|---|
| EP | 0 612 929 A2 | 8/1994 |
| EP | 0 825 356 B1 | 2/1998 |
| JP | 4-203627 | 7/1992 |
| JP | 2001-213185 | 8/2001 |

* cited by examiner

Primary Examiner—Saúl J. Rodríquez
(74) Attorney, Agent, or Firm—Westerman, Hattori, Daniels & Adrian, LLP

(57) ABSTRACT

A torque cam mechanism comprises first and second cam members disposed relatively rotatably around a common axis and cam balls adapted to fit in first and second cam grooves formed, respectively, in confronting surfaces of the first and second cam members. The depth of the first cam grooves is made larger than the radius of the cam balls, whereas the depth of the second cam grooves is made smaller than the radius of the cam balls, whereby even though a centrifugal force is applied to the cam balls which rotate together with the first and second cam members, the generation of thrust forces for separating the confronting surfaces of the first and second cam members can be suppressed by receiving the centrifugal force so applied to the cam balls by the first cam grooves which are deeper.

5 Claims, 8 Drawing Sheets

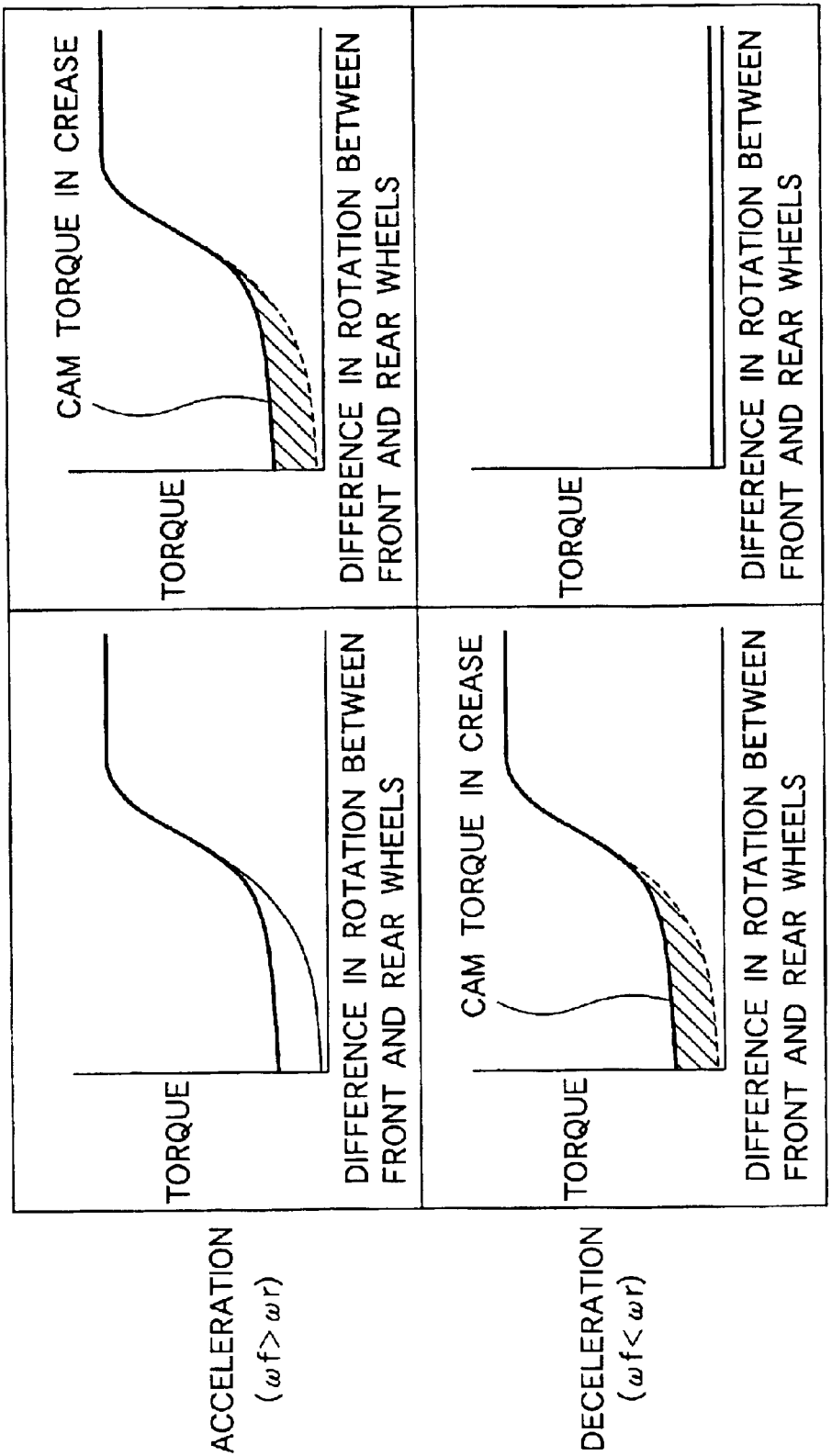

TORQUE CAM MECHANISM AND POWER TRANSMISSION SYSTEM FOR FOUR-WHEEL DRIVE VEHICLE

BACKGROUND OF THE INVENTION

1. Field of the Invention

The present invention relates to a torque cam mechanism comprising first and second cam members which are disposed relatively rotatably around a common axis and cam balls adapted to fit in both first and second cam grooves formed in confronting surfaces of the first and second cam members which confront each other. In addition, the invention relates to a power transmission system for a four-wheel drive vehicle which utilizes the torque cam mechanism.

2. Description of the Related Art

The torque cam mechanism is known, for example, by JP-A-2001-213185.

In a torque cam mechanism of this type, when the first and second cam members rotate relatively in one direction, the cam balls ride on cam portions of the first and second cam members to thereby generate thrust forces in axial directions for separating both the cam members from each other, while when the first and second cam members rotate relatively in the other direction, the cam balls are locked at stopper portions in the first and second cam grooves to thereby restrain the relative rotation in the other direction.

Incidentally, when the first and second cam members do not rotate relatively, there should be generated no axial thrust force for separating both the cam members from each other. However, even though the first and second cam members do not rotate relatively but rotate together, when the cam balls are biased radially outwardly by a centrifugal force, there are generated thrust forces for separating the first and second cam members from each other. Consequently, in the event that this torque cam mechanism is provided in the multi-plate clutch, there is caused a problem that clutch plates are caused to engage by the thrust forces to thereby generate an undesirable drag torque.

SUMMARY OF THE INVENTION

The invention was made in view of the situation, and an object of the invention is to provide a torque cam mechanism which can reduce thrust forces for separating a pair of cam members from each other which are generated by a centrifugal force applied to cam balls.

With a view to attaining the object, according to a first aspect of the invention, there is proposed a torque cam mechanism comprising first and second cam members which are disposed relatively rotatably around a common axis and cam balls adapted to fit in both first and second cam grooves formed, respectively, in confronting surfaces of the first and second cam members which confront each other, wherein the first and second cam grooves are provided, respectively, with cam portions for permitting the movement of the cam ball in circumferential directions, whereby when the first and second cam members rotate relatively the cam balls ride on the cam portions of the first and second cam grooves to thereby generate axial thrust forces for separating both the confronting surfaces from each other, the torque cam mechanism being characterized in that the depth of one of the first and second cam grooves is larger than the radius of the cam ball, while the depth of the other is smaller than the radius of the cam ball.

According to the construction, since the depth of one of the first and second cam grooves is made to be larger than the radius of the cam ball, while the depth of the other is made to be smaller than the radius of the cam ball, even though the cam balls rotate together with the first and second cam members, a centrifugal force generated can be received by the deeper cam groove of the first and second cam members to thereby restrain the generation of thrust forces for separating the confronting surfaces of the first and second cam members from each other.

According to a second aspect of the invention, there is proposed a torque cam mechanism as set forth in the first aspect of the invention, wherein the first and second cam grooves are provided, respectively, with stopper portions for restraining the movement of the cam ball in a circumferential direction and cam portions for permitting the movement of the cam ball in circumferential directions, whereby when the first and second cam members rotate relatively in one direction the cam balls ride on the cam portions of the first and second cam grooves to thereby generate axial thrust forces for separating both the confronting surfaces from each other, while when the first and second cam members rotate relatively in the other direction the cam balls are locked at the stopper portions of the first and second cam grooves to thereby restrain the relative rotation in the other direction, and wherein the first cam member is provided with projections which project from its confronting surface in such a manner as to cooperate, respectively, with the stopper portions of the first cam grooves, while the second cam member is provided with projections which project from its confronting surface in such a manner as to cooperate, respectively, with the stopper portions of the second cam grooves.

According to the construction, since the projections are formed on the confronting surface of the first cam member in such a manner as to cooperate, respectively, with the stopper portions in the first cam grooves and the projections are formed on the confronting surface of the second cam member in such a manner as to cooperate, respectively, with the stoppers in the second cam grooves, when the first and second cam members rotate relatively in the other direction such that the cam balls are brought into abutment with the stopper portions in the first and second cam groove the occurrence of a case where the cam balls ride on the stopper portions in the first and second cam grooves can securely be prevented by the action of the projections on both the confronting surfaces.

According to a third aspect of the invention, there is proposed a power transmission system for a four-wheel drive vehicle which comprises a torque cam mechanism as set forth in the first or second aspect of the invention, the power transmission system for a four-wheel drive vehicle comprising front wheels to which the driving force of an engine is transmitted directly and rear wheels to which part of the driving force of the engine is transmitted indirectly via a multi-plate clutch, wherein the multi-plate clutch engages by virtue of hydraulic pressures generated by hydraulic pumps according to a difference in rotation between the front wheels and the rear wheels, as well as by thrust forces generated by the torque cam mechanism according to a difference in rotation between the front wheels and the rear wheels.

According to the construction, in the event that the rotating speed of the front wheels exceeds the rotating speed of the rear wheels when the vehicle runs forward, since thrust forces generated by the relative rotation of the first and second cam members of the torque cam mechanism immediately brings the multi-plate clutch into engagement, the response with which the vehicle is put in a four-wheel drive condition can be increased by transmitting the driving force from the front wheels to the rear wheels immediately the front wheels slip to generate the difference in rotation between the front and rear wheels when the vehicle starts to move forward from a standstill or is drastically accelerated while moving forward. Thereafter, since the multi-plate clutch is also brought into engagement by hydraulic pressures generated by the hydraulic pumps with a slight time-lag, a sufficient amount of driving force that is transmitted from the front wheels to the rear wheels can be secured. In contrast, in the event that the rotating speed of the rear wheels exceeds the rotating speed of the front wheels by panic braking when the vehicle is moving forward, since the torque cam mechanism generates no thrust force, any interference with the ABS mechanism can be avoided by preventing the transmission of the driving force from the front wheels to the rear wheels. Moreover, since the generation of thrust forces for separating the first and second cam members from each other by the centrifugal force applied to the cam balls can be restrained to a minimum level by the torque cam mechanism in which the depths of the first and second cam grooves are different, whereby the generation of unwanted drag torque in the multi-plate clutch can be prevented. Thus, the construction can contribute to the reduction in running resistance, as well as fuel consumption.

BRIEF DESCRIPTION OF THE DRAWINGS

FIG. 8 are graphs explaining the function of the embodiment of the invention.

DETAILED DESCRIPTION OF THE PREFERRED EMBODIMENTS

A mode for carrying out the invention will be described based on an embodiment of the invention illustrated in the accompanying drawings.

Figure 1:
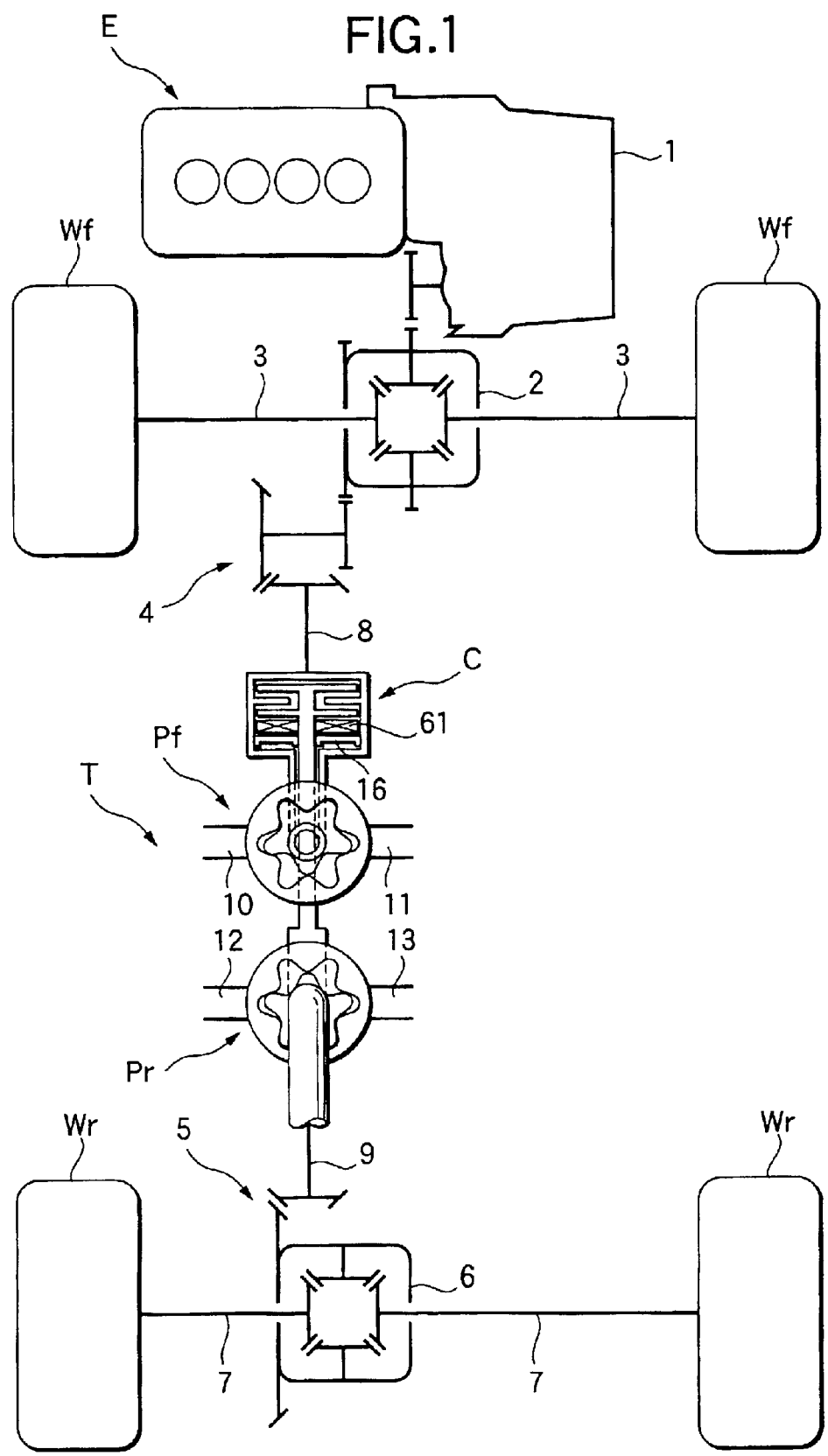
FIG. 1 is a diagram showing a power transmission system for a four-wheel drive vehicle.

As shown in FIG. 1, the output from an engine E mounted in a front part of a four-wheel drive vehicle is inputted into a front-wheel side differential 2 via a transmission 1. The output from the differential 2 is transmitted to left and right front wheels Wf, Wf via drive axles 3, 3. The output from the engine F so inputted into the differential 2 is inputted into a power transmission system T, which will be described later, via a bevel gear set 4. The output from the power transmission system T is transmitted to a rear-wheel side differential 6 via a bevel gear set 5, and the output from the differential 6 is further transmitted to left and right rear wheels Wr, Wr via drive axles 7, 7.

The power transmission system T includes a primary hydraulic pump Pf adapted to be driven by an input shaft 8 which extends from the front-wheel side bevel gear set 4, a secondary hydraulic pump Pr adapted to be driven by an output shaft 9 which connects to the rear-wheel side bevel gear set 5, a wet type multi-plate clutch C for governing the transmission and cutoff of the driving force between the input shaft 8 and the output shaft 9, and an oil hydraulic circuit for controlling the multi-plate clutch C, which will be described later.

Next, referring to FIGS. 2 and 3, the multi-plate clutch C and the oil hydraulic circuit will be described. The primary hydraulic pump Pf is constructed by a trochoid pump including a first port 10 and a second port 11. The first port 10 functions as a discharge port when the vehicle moves forward while functioning as a suction port when the vehicle moves rearward. The second port 11 functions as a suction port when the vehicle moves forward while functioning as a discharge port when the vehicle moves rearward. The secondary hydraulic pump Pr similarly is constructed by a trochoid pump including a third port 12 and a fourth port 13. The third port 12 functions as a suction port when the vehicle moves forward while functioning as a discharge port when the vehicle moves rearward. The fourth port 13 functions as a discharge port when the vehicle moves forward while functioning as a suction port when the vehicle moves rearward. The discharge amounts per rotation of both the hydraulic pumps Pf, Pr are set such that the discharge amount of the secondary pump Pr is slightly larger (for example, by 2.5%) than the discharge amount of the primary hydraulic pump Pf. Then, the first port 10 and the third port 12 connect to each other via a first connecting oil path 14, and the second port 11 and the fourth port 13 connect to each other via a second connecting oil path 15. In addition, since the discharge directions of both the hydraulic pumps Pf, Pr are determined by the rotating directions thereof, the discharge directions of the pumps get reversed between when the vehicle moves forward and when it moves rearward. Arrows in both the hydraulic pumps Pf, Pr shown in FIG. 2 indicate, respectively, discharge directions thereof when the vehicle moves forward.

The multi-plate clutch C includes a clutch housing 41 fixed to the input shaft 8 and a clutch hub 42 fixed to the output shaft 9 which fits in a rear end of the input shaft 8 coaxially and relatively rotatably via a roller bearing 29, and a plurality of clutch plates 43 . . . slidably supported on splines 41a formed on an inner circumference of the clutch housing 41 and a plurality of clutch plates 44 . . . slidably supported on splines 42a formed on an outer circumference of the clutch hub 42 are overlapped in such a manner as to abut with each other. A clutch piston 47 fits slidably in a cylinder 46 formed in a casing 45 via seal members 48, 48, and a hydraulic oil chamber 16 is formed in a back face of the clutch piston 47 where pressure oil is supplied for driving the clutch piston 47.

A torque cam mechanism 61 disposed at a rear portion of the multi-plate clutch C includes a first cam member 62, a second cam member 63 and a plurality of cam balls 64 . . . The second cam member 63 positioned on a front side of the torque cam mechanism 61 is spline connected to an inner circumferential surface of the clutch hub 42 in such a manner as to move axially along the clutch hub 42 but not to rotate relative thereto, while a friction clutch 67 is disposed between splines 62c formed on a outer circumference of the first cam member 62 which is positioned on a rear side of the torque cam mechanism 61 and the splines 41a on the inner circumference of the clutch housing 41. A pre-load is imparted to the friction clutch 67 so that the clutch 67 slips when a torque exceeding a predetermined value is applied between the first cam member 62 and the clutch housing 41.

An end plate 71 is supported between the splines 41a of the clutch housing 41 and a sleeve 65 which continuously connect to the primary hydraulic pump Pf in such a manner as to move in axial directions but not to rotate relatively. A thrust bearing 72 is disposed between a front face of the end plate 71 and a rear face of the first cam member 62, whereas a thrust bearing 73 is disposed between a rear face of the end plate 71 and a front face of the clutch piston 47.

A cylindrical member 69 extending from the end plate 71 toward the interior of the clutch hub 42 has a number of small holes and functions to dissipate by virtue of a centrifugal force lubricating oil supplied from an oil passage 9a formed inside the output shaft 9 and oil holes 9b so as to uniformly lubricate the clutch plates 43 . . . , 44 . . . of the multi-plate clutch C. To make this happen, the output shaft 9 may be made to be a solid shaft, and an oil passage may be formed between the output shaft 9 and the sleeve 65, whereby required lubrication may be implemented via the cylindrical member 69.

As is clear from FIGS. 4 to 7, a plurality of first cam grooves 74 . . . are formed in a confronting surface 62a of the first cam member 62 of the torque cam mechanism 61 in such a manner as to be disposed in a circumferential direction (for example, six cam grooves at 60 degrees intervals). The first cam grooves 74 are each constituted by a cam portion 74a which is inclined such that the depth of the first cam groove 74 gets gradually shallower and a partially spherical stopper portion 74b which continuously connects to a deepest portion of the cam portion 74a. The radius of curvature of the stopper portion 74b is set to be the same as that of the cam ball 64. Then, a projection 62b is provided on the confronting surface 62a in such a manner as to project therefrom so as to prevent the movement of the cam ball 64 in cooperation with the stopper portion 74b.

Similarly, a plurality of second cam grooves 75 . . . are formed in a confronting surface 63a of the second cam member 63 of the torque cam mechanism 61 in such a manner as to be disposed in a circumferential direction (for example, six cam grooves at 60 degrees intervals). The second cam grooves 75 are each constituted by a cam portion 75a which is inclined such that the depth of the second cam groove 75 gets gradually shallower and a partially spherical stopper portion 75b which continuously connects to a deepest portion of the cam portion 75a. The radius of curvature of the stopper portion 75b is set to be the same as that of the cam ball 64. Then, a projection 63b is provided on the confronting surface 63a in such a manner as to project therefrom so as to prevent the movement of the cam ball 64 in cooperation with the stopper portion 75b.

Figure 7A:
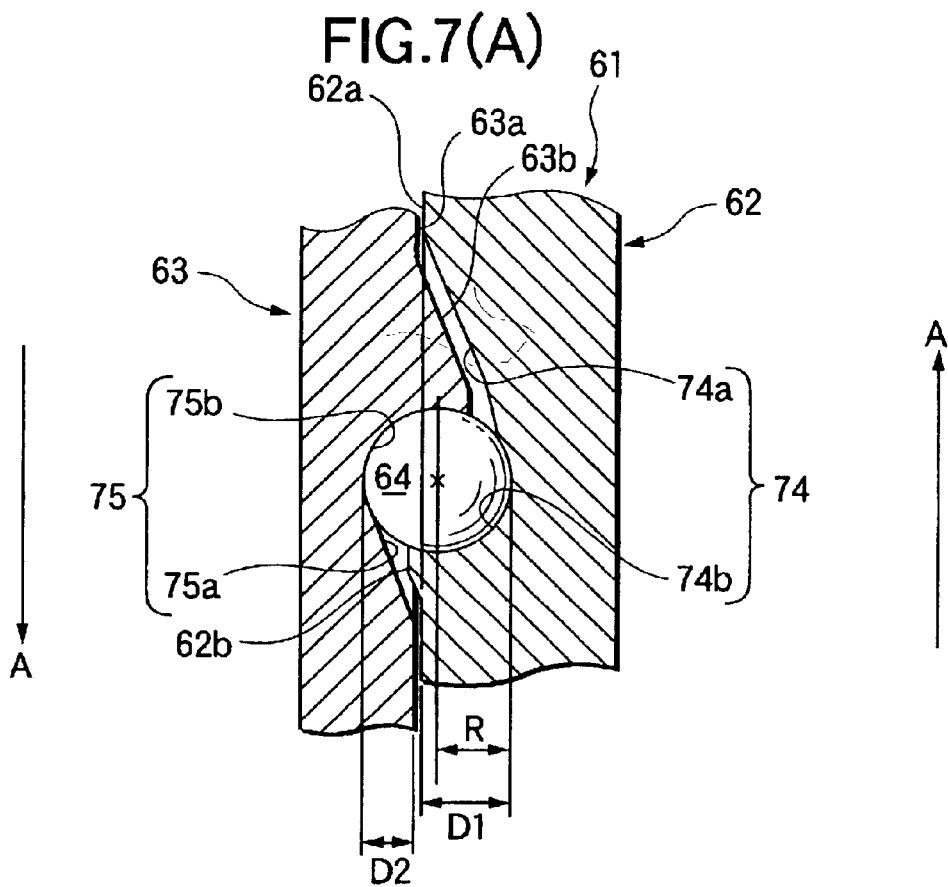
FIG. 7 is an enlarged sectional view taken along the line 7—7 in FIG. 3.

As shown in FIG. 7A, when the first cam member 62 and the second cam member 63 rotate relatively in directions indicated by arrows A, the cam ball 64 comes into abutment with the stopper portions 74b, 75b of the first and second cam grooves 74, 75 of the first and second cam members 62, 63, and the confronting surfaces 62a, 63a of the first and second cam members 62, 63 are then in a state in which they approach each other most closely. When the first and second cam members 62, 63 rotate relatively from this state in directions indicated by arrows B, the cam ball 64 rides on the cam portions 74a, 75a of the first and second cam grooves 74, 75 in the first and second cam members 62, 63 to thereby generate axial thrust forces f, whereby the confronting surfaces 62a, 63a of the first and second cam members 62, 63 move in directions in which they separate from each other.

In addition, when the first and second cam members 62, 63 approach each other, the projection 62b on the first cam member 62 fits in the second cam groove 75 in the second cam member 63, and the projection 63b on the second cam member 63 fits in the first cam groove 74 in the first cam member 62, whereby the confronting surfaces 62a, 63a of the first and second cam members 62, 63 are allowed to approach each other sufficiently.

Figure 3:
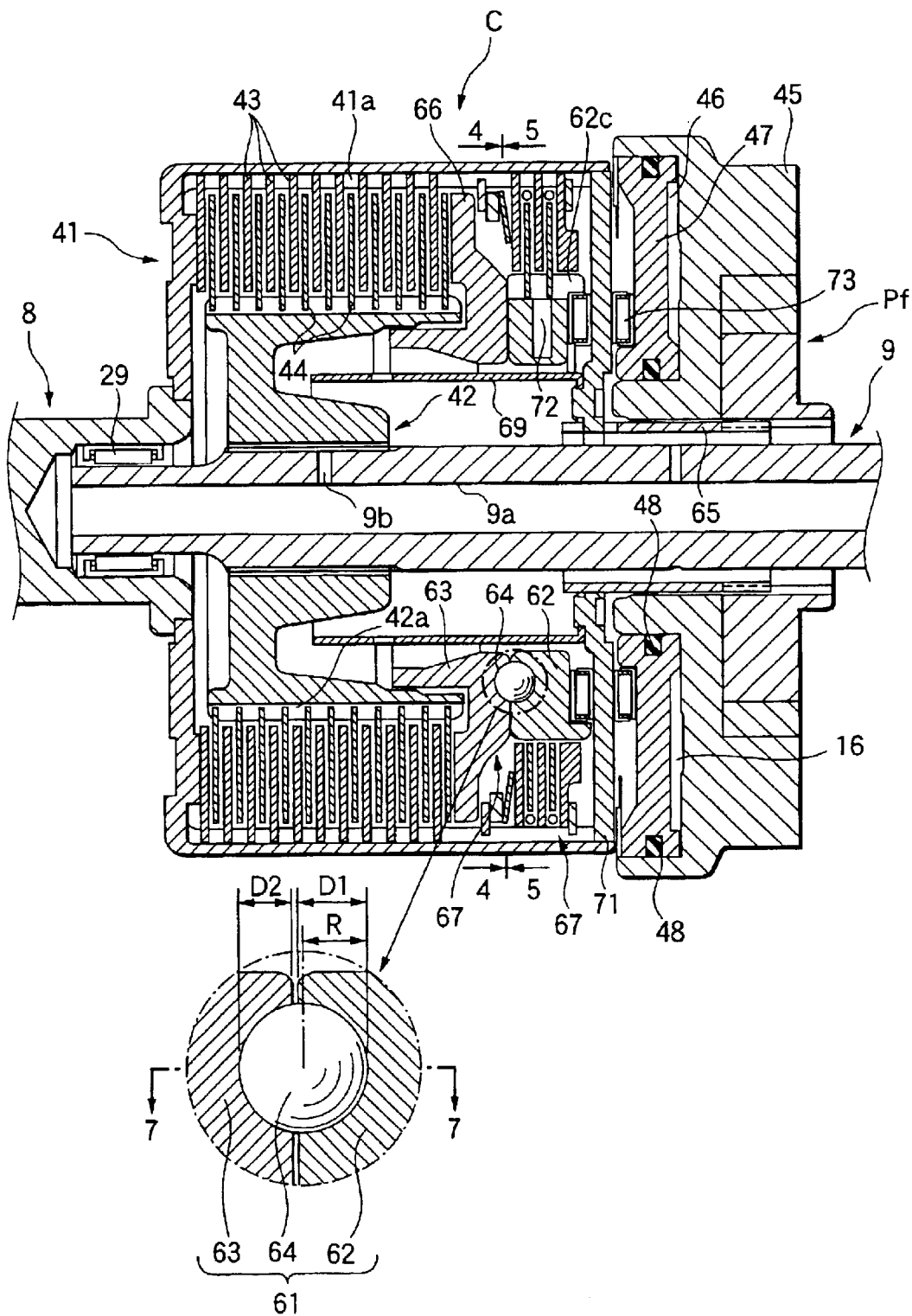
FIG. 3 is an enlarged sectional view of the multi-plate clutch.
Figure 4:
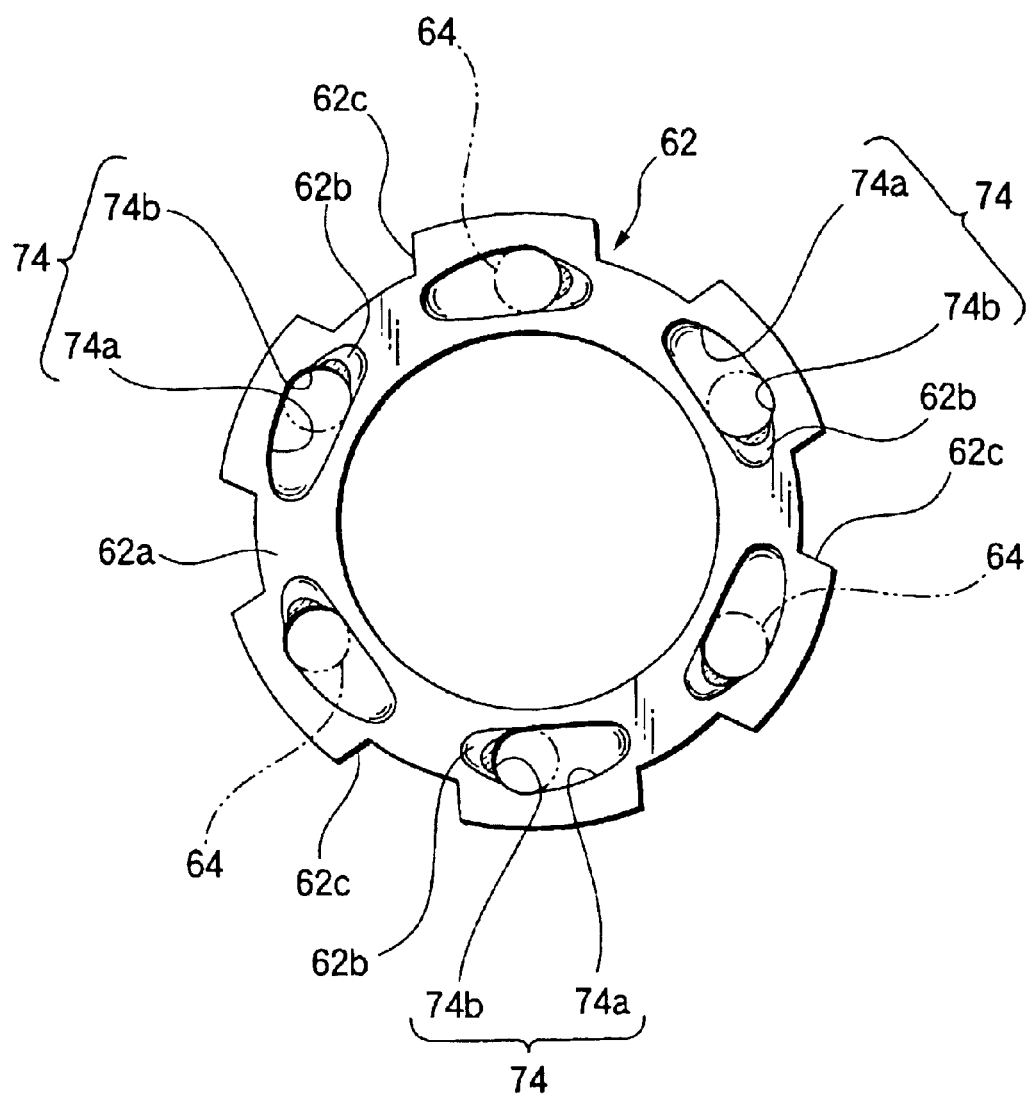
FIG. 4 is a view of the multi-plate clutch as viewed along the line 4—4 in a direction indicated by arrows in FIG. 3.
Figure 5:
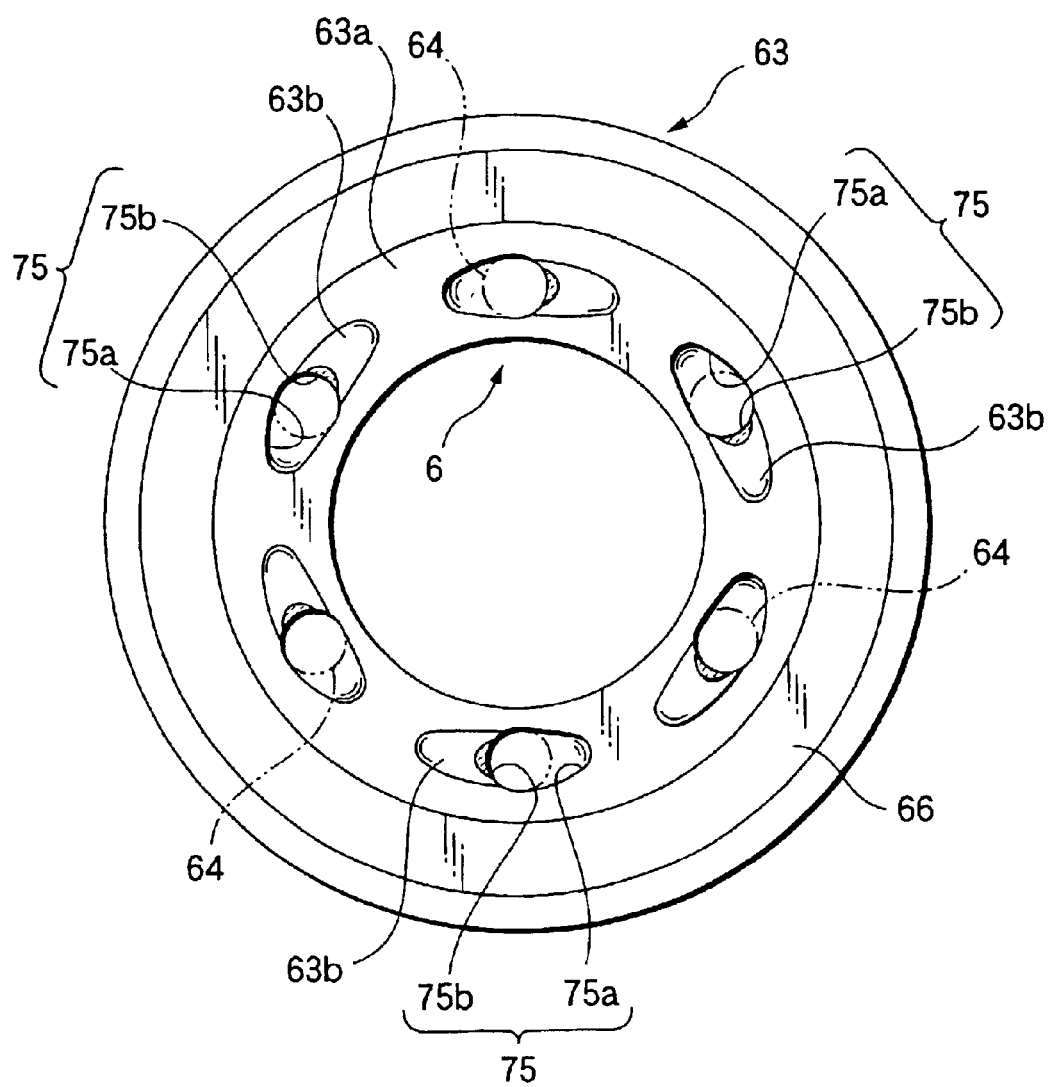
FIG. 5 is a view of the multi-plate clutch as viewed along the line 5—5 in a direction indicated by arrows in FIG. 3.
Figure 6:
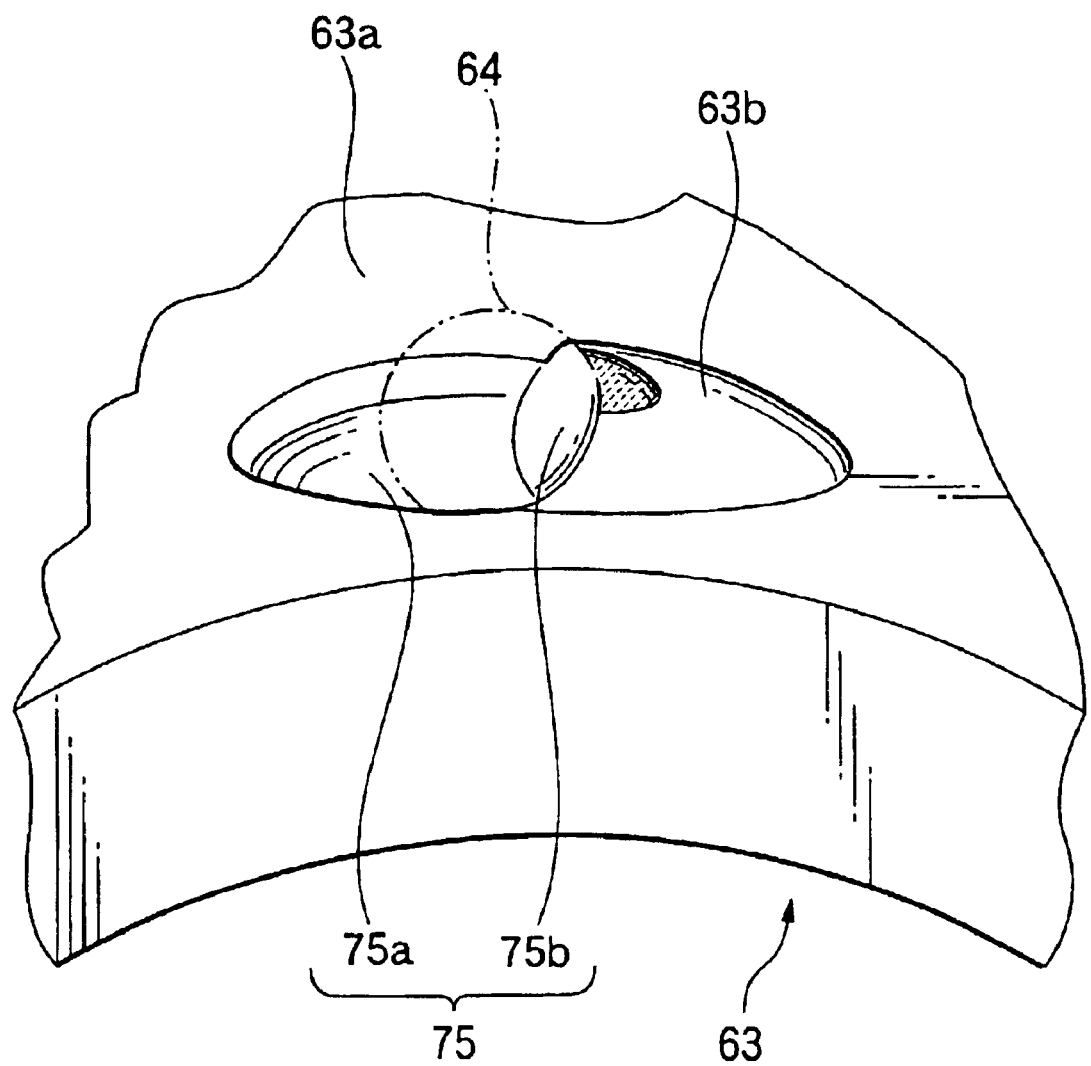
FIG. 6 is a view as viewed in a direction indicated by an arrow 6 in FIG. 5.

As is clear from FIGS. 3 and 7A, the depths of the first and second cam grooves 74, 75 in the first and second cam members 62, 63 are different. Namely, the depth D1 of the first cam groove 74 is set to be larger than the radius R of the cam ball 62, while the depth D2 of the second cam groove 75 is set to be smaller than the radius R of the cam ball 64, whereby the positions of the first and second confronting surfaces 62a, 63a of the first and second cam members 62, 63 deviate from the center of the cam ball 64 toward the second cam member 63.

Figure 2:
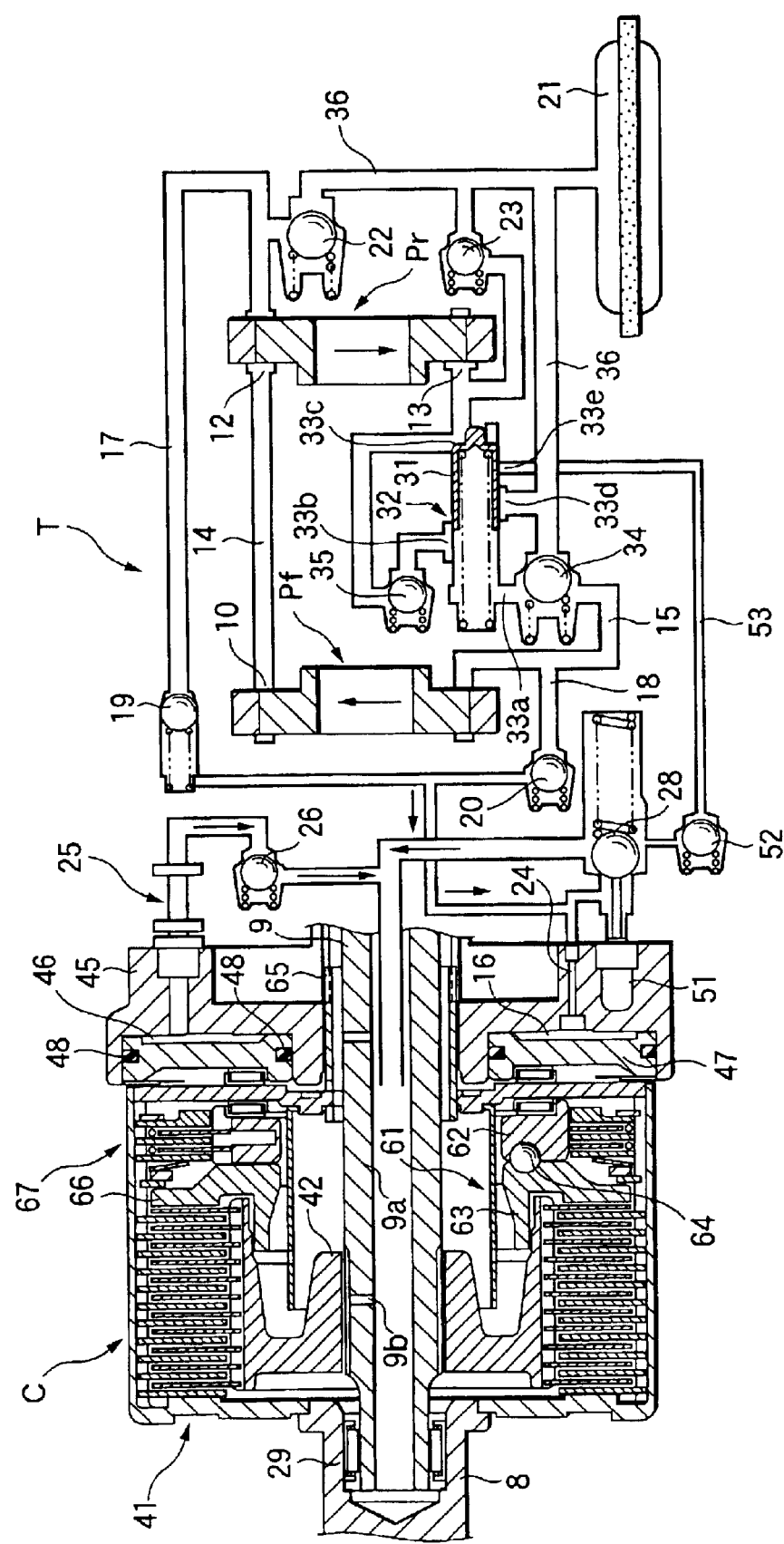
FIG. 2 is a view showing the constructions of a multi-plate clutch and an oil hydraulic circuit of the four-wheel drive vehicle.

As is clear from FIG. 2, the hydraulic oil chamber 16 of the multi-plate clutch C is connected to the first connecting oil path 14 via a third connecting oil path 17, and the hydraulic oil chamber 16 is connected to the second connecting oil path 15 via a fourth connecting oil path 18. A first one-way valve 19 is provided along the third connecting oil path 17 for permitting oil to flow only from the secondary hydraulic pump Pr to the hydraulic oil chamber 16, and a second one-way valve 20 is provided along the fourth connecting oil path 18 for permitting oil to flow only from the second connecting oil path 15 to the hydraulic oil chamber 16. In addition, a third one-way valve 22 and a fourth one-way valve 23 are provided along a fifth connecting oil path 36 which connects an oil tank 21 to the first connecting oil path 14 and the second connecting oil path 15 for permitting oil to flow only from the oil tank 21 to the first connecting oil path 14 and for permitting oil to flow only from the oil tank 21 to a port 33c, respectively.

A choke type throttle 24 is provided at a position upstream of the hydraulic oil chamber 16 of the multi-plate clutch C. In addition, an orifice type throttle 25 and a first relief valve 26 are provided in series at positions downstream of the hydraulic oil chamber 16, and downstream sides of the orifice type throttle 25 and the first relief valve 26 connect to the oil passage 9a formed inside the output shaft 9. The oil passage 9a communicates with the lubricating portion of the multi-plate clutch C or an interior space of the clutch housing 41 accommodating therein the clutch plates 43 . . . , 44 . . . via the oil holes 9b which penetrate the output shaft 9 in a radial direction.

The first relief valve 26 functions to prevent the reverse flow of air from the lubricating portion of the multi-plate clutch C to the hydraulic oil chamber 16 when the clutch piston 47 swings due to the eccentric rotation of the input shaft 8 and the output shaft 9.

A second relief valve 28 is provided between an upstream position of the choke type throttle 24 and a downstream position of the orifice type throttle 25 for regulating an upper limit value for oil pressure transmitted to the hydraulic oil chamber 16. A thermo-switch 51 is provided for the second relief valve 28 for forcibly opening the second relief valve 28 when the temperature of oil increases.

A spool valve 32 is provided along the second connecting oil path 15 in which a spool 31 biased rightward by a spring 30 is accommodated in the interior of a housing thereof. When the spool 31 is situated at a rightward position as shown, a communication between the port 33c and a port 33d is cut off by the spool 31 whereas a communication is established between a port 33a and a port 33b. On the other hand, when the spool 31 moves to a leftward position against the spring 30, a communication between the port 33a and the port 33b is cut off by the spool 31 whereas a communication is established between the port 33c and the port 33d. A fifth one-way valve 34 is provided between the port 33a and the port 33d for permitting oil to flow only from the port 33d to the port 33a, and a sixth one-way valve 35 is provided between the port 33b and the port 33c for permitting oil to flow only from the port 33b to the port 33c.

Consequently, when the vehicle is moving forward or the fourth port 13 of the secondary hydraulic pump Pr is delivering oil, the spool 31 is situated at the leftward position, whereby the second connecting oil path 15 and the first connecting oil path 14 are connected to each other due to the establishment of a communication between the port 33c and the port 33d. In contrast, when the vehicle is moving rearward or the second port 11 of the primary hydraulic pump Pf is delivering oil, the spool 31 is situated at the rightward position as shown the second connecting oil path 15 and the first connecting oil path 14 are connected to each other due to the establishment of a communication between the port 33a and the port 33b.

When the spool 31 of the spool valve 32 is situated at the rightward position, the port 33e whose communication with the port 33c is being cut off by the spool 31 then communicates with the oil passage 9a in the output shaft 9 via a lubricating oil path 53 along which a seventh one-way valve 52 is provided.

Next, the function of the embodiment of the invention will be described.

When the vehicle starts to move forward from a standstill, the driving force of the engine E is transmitted to the front wheels Wf, Wf via the transmission 1, the differential 2 and the drive axles 3, 3, and the driving force so transmitted to the differential 2 is transmitted to the primary hydraulic pump Pf via the bevel gear set 4 and the input shaft 8 for driving the primary hydraulic pump Pf. As this occurs, the multi-plate clutch C is in a disengaged condition, and the secondary hydraulic pump Pr which is connected to the output shaft 9 is in a halt condition. Consequently, oil sucked from the oil tank 21 into the second port 11 of the primary hydraulic pump Pf via the fifth one-way valve 34 is delivered from the first port 10 to the first connecting oil path 14. As this occurs, since the third one-way valve 22 of the fifth connecting oil path 36 is closed, the whole amount of oil delivered to the first connecting oil path 14 flows into the third connecting oil path 17 to be blocked by the second one-way valve 20 and therefore is supplied into the hydraulic oil chamber 16 of the multi-plate clutch C via the first one-way valve 19 and the choke type throttle 24.

When the multi-plate clutch C engages as has been described above, the rear wheels Wr, Wr are driven via the output shaft 9, the bevel gear set 5, the differential 6 and the drive axles 7, 7, and the secondary hydraulic pump Pr connected to the output shaft 9 rotates. As a result, oil discharged from the primary hydraulic pump Pr is sucked into the secondary hydraulic pump Pr via the first connecting oil path 14 according to an increase in the rotation speed of the rear wheels Wr, Wr, and oil discharged from the secondary hydraulic pump Pr moves leftward the spool 31 of the spool valve 32 against the spring 30 and is then sucked into the primary hydraulic pump Pf via the ports 33c, 33d and the fifth one-way valve 34. Then, the oil pressure applied to the hydraulic oil chamber 16 of the multi-plate clutch C or the engaging force of the multi-plate clutch C changes automatically according to a difference between the amount of oil discharged from the primary hydraulic pump Pf and the amount of oil sucked by the secondary hydraulic pump Pr. When the difference in rotating speed between the front and rear wheels becomes zero or, for example, when the vehicle reaches a forward constant-speed running condition, no oil pressure is applied to the hydraulic oil chamber 16 of the multi-plate clutch C, and the torque distribution to the rear wheels Wr, Wr is then cut off. In addition, as has been mentioned above, in the forward constant-speed running condition, while the discharge of the secondary hydraulic pump Pr exceeds that of the primary hydraulic pump Pf, oil discharged from the secondary hydraulic pump Pr moves leftward the spool 31 of the spool valve 32 against the spring 30, and the remaining of the oil so discharged from the secondary hydraulic pump Pr returns to the third port 12 of the secondary hydraulic pump Pr via the ports 33c, 33d and the third one-way valve 22 of the fifth connecting oil path 36.

In the forward constant-speed running condition, when oil discharged from the primary hydraulic pump Pf and the secondary hydraulic pump Pr circulates along the first connecting oil path 14 and the second connecting oil path 15, oil discharged from the secondary hydraulic pump Pr moves leftward the spool 31 of the spool valve 32 against the spring 30, whereby an oil pressure according to the biasing force of the spring is generated in the second connecting oil path 15 between the fourth port 13 and the port 33c. As a result, air sucked into the circulating oil from side clearances of rotors of both the hydraulic pumps Pf, Pr is compressed by the oil pressure so generated and is discharged sequentially from the side clearance closer to the fourth port 13 of the secondary hydraulic pump Pr, and therefore, no air is allowed to remain in the circulating air. Accordingly, it is ensured that a problem can be prevented that the rise of oil pressure is delayed due to air remaining in the circulating oil, resulting in a delay in the response of the multi-plate clutch C when there is thereafter generated a difference in rotating speed between the front wheels Wf, Wf and the rear wheels Wr, Wr, whereby there is generated, in turn, a difference in the amount of oil discharged from (or sucked by) the primary hydraulic pump Pf and the secondary hydraulic pump Pr.

Then, when there is generated a difference in the amount of oil discharged from (or sucked by) the primary hydraulic pump Pf and the secondary hydraulic pump Pr, an oil pressure corresponding to a set load for the first relief valve 26 is immediately applied to the hydraulic oil chamber 16 of the multi-plate clutch C. Then, after the first relief valve 26 opens, an oil pressure is applied to the hydraulic oil chamber 16 of the multi-plate clutch C which is determined by a difference in the amount of oil discharged from the primary hydraulic pump Pf and the secondary hydraulic pump Pr, the pressure drop properties of the orifice type throttle 25 and the choke type throttle 24, or the viscosity of oil. Then, since the upper limit value of the oil pressure is limited by a set load for the second relief valve 28, the upper limit value of the transmission torque of the multi-plate clutch C can be adjusted by suitably setting the set load of the second relief valve 28.

Incidentally, the amount of oil which passes through the choke type throttle 24 is influenced by the viscosity of oil, and when the viscosity of oil increases in a low-temperature condition, the amount of oil flowing through the choke type throttle 24 decreases, and therefore, the amount of oil which passes through the hydraulic oil chamber 16 of the multi-plate clutch C and the orifice type throttle 25 also decreases. As this occurs, since a pressure drop occurring before and after the orifice type throttle 25 is in proportion to the square of the amount of oil which passes through the orifice type throttle 25, when the amount of oil passing through the orifice type throttle 25 decreases, the pressure drop thereat also decreases, whereas the pressure drop at the choke type throttle 24, which is situated upstream of the orifice type throttle 25, increases by an extent equal to the decreased pressure drop at the orifice type throttle 25. Thus, the oil pressure applied to the hydraulic oil chamber 16 in the low-temperature condition, or a pressure resulting when the pressure drop at the choke type throttle 24 is subtracted from the pressure set at the second relief valve 28 decreases. Consequently, even though the friction coefficient increases due to an increase in the viscosity of oil, a pressing force applied to the clutch plates 43 . . . , 44 . . . by virtue of the oil pressure decreases equally, and therefore, on the whole, an increase in engaging force of the multi-plate clutch C in the low-temperature condition can be prevented. On the other hand, in a high-temperature condition, the viscosity of oil decreases and the friction coefficient also decreases. However, in this case, in contrast to the low-temperature condition, the pressure drop by the choke type throttle 24 decreases, and the oil pressure applied to the hydraulic oil chamber 16 of the multi-plate clutch C increases. Therefore, the pressing force applied to the clutch plates 43 . . . , 44 . . . increases by an extent equal to the increase in the oil pressure applied to the hydraulic oil chamber 16, whereby a decrease in the engaging force of the multi-plate clutch C can be prevented.

Thus, oil discharged from the hydraulic oil chamber 16 of the multi-plate clutch C via the orifice type throttle 25 and the first relief valve 26 and oil discharged from the upstream position of the hydraulic oil chamber 16 via the second relief valve 28 when the vehicle starts to move forward from a standstill and is drastically accelerated while running forward are supplied to the interior of the multi-plate clutch C from the oil passage 9a and oil holes 9b of the output shaft 9, where oil so supplied is then caused to splash radially outwardly from the oil holes in the cylindrical member 69 which rotates relatively to the output shaft 9 by virtue of a centrifugal force for uniform lubrication of the respective clutch pates 43 . . . , 44 . . . Oil that has lubricated the clutch plates 43 . . . , 44 . . . returns to the oil tank 21 by passing through an oil path (not shown).

As has been described above, since no pressure oil is supplied to the hydraulic oil chamber 16 of the multi-plate clutch C when the vehicle is running forward at constant speeds, no lubricating oil is supplied to the lubricating portion of the multi-plate clutch C via the hydraulic oil chamber 16. However, while the vehicle is running forward at constant speeds, a predetermined oil pressure is generated when oil discharged from the fourth port 13 of the secondary hydraulic pump Pr moves leftward the spool 31 of the spool valve 32 against the spring 30, and moreover, excessive oil is delivered to the second connecting oil path 15 by virtue of a difference in discharge per rotation between both the hydraulic pumps Pf, Pr. Therefore, part of the excessive oil is supplied to the oil passage 9a in the output shaft 9 from the lubricating oil path 53 by virtue of a pressure generated when the spool valve 32 is opened and is then supplied from the oil passage 9a to the lubricating portion of the multi-plate clutch C via the oil holes 9b. Thus, even when the vehicle is running forward at constant speeds with the multi-plate clutch C being in the disengaged condition, lubricating oil can be supplied to the lubricating portion of the multi-plate clutch C for lubricating the clutch plates 43 . . . , 44 . . . , whereby a risk can be prevented that the multi-plate clutch C is heated excessively.

In addition, the seventh one-way valve 52 provided along the lubricating oil path 53 will function as below. Namely, in the event that a negative pressure is generated when the vehicle starts to move forward from a standstill or is drastically accelerated while running forward, air sucked in from the lubricating portion of the multi-plate clutch C can be prevented by the seventh one-way valve 52 from being sucked into the primary hydraulic pump Pf via the lubricating oil path 53, the port 33e, the port 33d, the fifth one-way valve 34 and the second connecting oil path 15.

In the event that only the front wheels Wf, Wf run on a road surface having a low friction coefficient or are drastically accelerated while the vehicle is running forward at constant speeds, there may occur a case where the front wheels Wf, Wf are transitionally put in a slip condition. In such a condition, the discharge amount from the primary hydraulic pump Pf connected to the input shaft 8 exceeds the suction amount of the secondary hydraulic pump Pr connected to the output shaft 9, and with the third one-way valve 22 being closed, the communication between the first connecting oil path 14 and the second connecting oil path 15 via the fifth connecting oil path 36 is blocked. Therefore, as has been described, the multi-plate clutch C engages and the driving force is distributed to the rear wheels Wr, Wr.

The braking force distribution between the front and rear wheels is set in general such that a braking force applied to the front wheels Wf, Wf becomes higher than a braking force applied to the rear wheels Wr, wr, and therefore, when a braking force is applied to the wheels, the front wheels Wf, Wf are locked earlier than the rear wheels Wr, Wr at the time of panic braking. In addition, since engine brake applied while the vehicle is running at constant speeds is designed to be applied to only the front wheels Wf, Wf, in this case, too, the rotating speed of the front wheels Wf, Wf transitionally becomes smaller than that of the rear wheels Wr, Wr. As this occurs, the discharge amount from the secondary hydraulic pump Pr exceeds the suction amount of the primary hydraulic pump Pf, whereby excessive oil is delivered to the second connecting oil path 15. Furthermore, in the event that the front wheels Wf, Wf are completely locked, the primary hydraulic pump Pf is halted and only the secondary hydraulic pump Pr is allowed to rotate. Owing to this, the whole amount of oil discharged from the secondary hydraulic pump Pr becomes excessive.

However, this excessive oil returns to the third port 12 of the secondary hydraulic pump Pr via the port 33c and the port 33d of the spool valve 32 and the third one-way valve 22 of the fifth connecting oil path 36. Thus, even if the rotating speed of the rear wheels Wr, Wr exceeds that of the front wheels Wf, Wf, since an oil pressure based on the difference in discharge between the primary hydraulic pump Pf and the secondary hydraulic pump Pr is not applied to the hydraulic oil chamber 16, the multi-plate clutch C is held in the disengaged condition, and the braking force transmission from the front wheels Wf, Wf to the rear wheels Wr, Wr is blocked, whereby there is no risk that a change occurs in the braking force distribution between the front and rear wheels.

In addition, since the multi-plate clutch C does not engage when the brake is applied to the vehicle while running forward, no lubrication is carried out of the multi-plate clutch C by oil which has passed through the first relief valve 26. However, similarly to the case where the vehicle runs forward at constant speeds, part of oil discharged from the secondary hydraulic pump Pr is supplied to the multi-plate clutch C via the spool valve 32 and the lubricating oil path 53, and the lubrication of the lubricating portion of the multi-plate clutch C can be implemented with no problem.

When the vehicle moves backward, the rotating directions of the primary and secondary hydraulic pumps Pr, Pr are both reversed, and the relationship between the discharge port and the suction port becomes opposite to that described above.

Namely, when the rotating speed of the front wheels Wf, Wf exceeds the rotating speed of the rear wheels Wr, Wr when driving backward from rest or drastically accelerating while driving backward, since the discharge amount of the primary hydraulic pump Pf exceeds the suction amount of the secondary hydraulic pump Pr, an oil pressure is generated in the second connecting oil path 15. As this occurs, the spool 31 of the spool valve 32 is held at the position as shown in the figure against the spring 30, and oil delivered to the second connecting oil path 15 due to a difference between the discharge amount from the second port 11 of the primary hydraulic pump Pf and the suction amount from the fourth port 13 of the secondary hydraulic pump Pr is prevented from flowing into the fifth connecting oil path 36 by the fourth one-way valve 23 and the fifth one-way valve 34, as has been described above, and therefore flows into the fourth connecting oil path 18. The oil that has so flowed into the fourth connecting oil path 18 then passes through the second one-way valve 20 but is blocked by the first one-way valve 19, and therefore is supplied to the hydraulic oil chamber 16 of the multi-plate clutch C, whereby the multi-plate clutch C engages so that the driving force is distributed to the rear wheels Wr, Wr. While the rotating speeds of the primary hydraulic pump Pf and the secondary hydraulic pump Pr become identical when the rotating speed of the rear wheels Wr, Wr increases and the vehicle reaches a rearward constant-speed running condition, since the discharge amount per rotation of the secondary hydraulic pump Pr is larger than the discharge amount per rotation of the primary hydraulic pump Pf, an amount of oil corresponding to the difference is supplied to the first connecting oil path 14. As a result, when running rearward, even in the constant-speed running condition, torque is distributed from the front wheels Wf, Wf to the rear wheels Wr, Wr.

In this rearward constant-speed running condition, no load is applied by the spring 30 of the spool valve 32 to oil circulating in a circulating oil path having the first connecting oil path 14 and the second connecting oil path 15. However, since in general the rearward constant-speed running condition doest not continue for a long time, sucking air from the side clearances of the rotors of both the hydraulic pumps Pf, Pr and halting the supply of lubricating oil to the multi-plate clutch C cause substantially no problem.

In addition, since the rotating speed of the primary hydraulic pump Pf becomes lower than that of the secondary hydraulic pump Pr when the brake is applied to the vehicle while it is moving rearward, an oil pressure is generated in the first connecting oil path 14 due to a difference between the discharge amount from the third port 12 of the secondary hydraulic pump Pr and the suction amount from the first port 10 of the primary hydraulic pump Pf. As this occurs, since the third one-way clutch 22 is closed, the multi-plate clutch C engages via the first one-way valve 19 of the third connecting oil path 17, whereby the braking force of the front wheels Wf, Wf is transmitted to the rear wheels Wr, Wr.

When the vehicle is running rearward as is described above, the second port 11 of the primary hydraulic pump Pf serves as a discharge port and the fourth port 13 of the secondary hydraulic pump Pr serves as a suction port, and therefore, the spool of the spool valve 32 is held at the rightward position as shown in the figure at all times. In this condition, even though the spool 31 is locked at a leftward position for some reason, the discharging pressure from the second port 11 of the primary hydraulic pump Pf is blocked by the fifth one-way valve 34 and is then applied to the port 33a of the spool valve 32, whereby the spool 31 locked at the leftward position is pushed back to the rightward position, which is the normal position. As this occurs, even though the locking of the spool 31 is not cancelled, since the oil pressure generated in the second connecting oil path 15 is relieved from the second relief valve 28 via the fourth connecting oil path 18, there is caused no risk that an excessive load is applied to the primary hydraulic pump Pf.

The engagement of the multi-plate clutch C that has been described heretofore is executed when the clutch piston 47, the thrust bearing 73, the end plate 71, the thrust bearing 72 and the torque cam mechanism 61 are advanced by oil supplied to the hydraulic oil chamber 16, whereby a pressing portion 66 of the second cam member 63 presses against the clutch plates 43 . . . , 44 . . . As this occurs, the torque cam mechanism 61 interposed between the clutch piston 47 and the clutch plates 43 . . . , 44 . . . will function as below.

As has been described when describing the construction of the hydraulic circuit, and additionally as shown in FIG. 8, the multi-plate clutch C engages when the vehicle is accelerated while it is running forward, when the vehicle is accelerated while it is running rearward, and when the brake is applied to the vehicle while it is running rearward, whereby a torque transmission between the front wheels Wf, Wf and the rear wheels Wr, Wr is implemented, and the multi-plate cutch C does not engage only when the brake is applied to the vehicle while it is running forward, whereby no torque transmission occurs between the front wheels Wf, Wf and the rear wheels Wr, Wr. As has been described above, the torque cam mechanism 61 also has a one-way cam function, and the first cam member 62 and the second cam member 63 of the torque cam mechanism 61 rotate relatively from a condition shown in FIG. 7A to a condition shown in FIG. 7B, whereby thrust forces for bringing the multi-plate clutch C into engagement is generated. Consequently, as shown at top right-hand side in FIG. 8, the torque cam mechanism 61 is actuated at an initial stage of a forward acceleration that happens with a high frequency while the vehicle is running, so that the engagement of the multi-plate clutch C can be assisted by an oil pressure, thereby making it possible to increase the response of the transition to a four-wheel drive condition.

Moreover, since the engaging force of the multi-plate clutch C that is generated by the torque cam mechanism 61 gradually decreases as the engaging force of the multi-plate cutch C that is generated by the oil pressure increases, the complete engagement of the multi-plate clutch C by only the torque cam mechanism 61 can be prevented, thereby making it possible to avoid the occurrence of differential locking.

In addition, as shown at bottom right-hand side in FIG. 8, the engagement of the multi-plate clutch C by the oil pressure is not implemented when the brake is applied to the vehicle while it is running forward, and moreover, since the relative rotating directions of the first and second cam members 62, 63 are reversed, there is no chance that the thrust forces f for bringing the multi-plate clutch C into engagement are generated by the torque cam mechanism 61 with the one-way cam function.

Consequently, the vehicle is maintained in a two-wheel drive condition when the brake is applied to the vehicle while running forward, and the interference with the ABS system is avoided, whereby the braking performance of the vehicle can be secured.

Additionally, as shown at top left-hand side in FIG. 8, when the vehicle is accelerated while it is running rearward, the multi-plate clutch C is brought into engagement by the oil pressure, however, there is no chance that the thrust forces f for bringing the multi-plate clutch C into engagement are generated by the torque cam mechanism 61 with the one-way cam function.

In addition, as shown at bottom left-hand side in FIG. 8, when the brake is applied to the vehicle while it is running rearward the multi-plate clutch C is brought into engagement by the oil pressure, and the thrust forces f for bringing the multi-plate clutch C into engagement are generated by the torque cam mechanism 61 with the one-way cam function, thereby resulting in a condition in which the engagement of the multi-plate clutch C by the oil pressure is assisted by the thrust forces f of the torque cam mechanism 61.

Thus, the multi-plate clutch C can be brought into engagement by both the torque cam mechanism 61 and the oil pressure at the initial stage of the forward acceleration that practically happens with a high frequency, the response with which the vehicle is put in the four-wheel drive condition can be enhanced, and sufficient driving force can be distributed to the rear wheels wr, Wr. Similarly, the vehicle can be maintained in the two-wheel drive condition at the time of forward deceleration that practically happens with a high frequency to thereby avoid the interference with the ABS system.

Figure 7B:
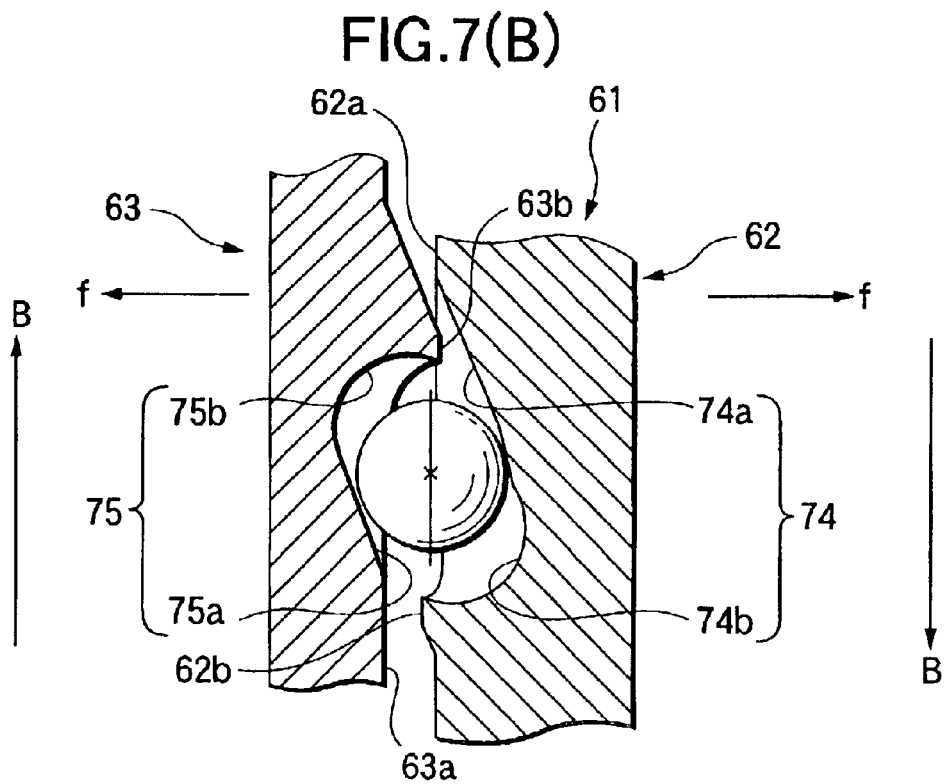

In addition, when the torque cam mechanism 61 is actuated to be put in the condition shown in FIG. 7B, and even after the relative rotation of the first cam member 62 and the second cam member 63 is regulated, the relative rotations of the front wheels Wf, Wf and the rear wheels Wr, Wr continue further, however, the friction clutch 67 slips to permit the relative rotations of the clutch housing 41 and the first cam member 62, and the relative rotations of the end plate 71 which rotates together with the clutch housing 41 and the first cam member 62 which rotates together with clutch hub 42 by virtue of the action of the thrust bearing 72. In addition, the thrust bearing 73 disposed between the clutch piston 47 and the end plate 71 permits the relative rotation of the end plate 71 relative to the clutch piston 47 which does not rotate relative to the housing 45.

Incidentally, when the cam balls 64 rotate together with the first and second cam members 62, 63, since the cam balls 64 . . . are biased radially outwardly by virtue of a centrifugal force, the cam balls 64 function as wedges to thereby generate loads for separating the confronting surfaces 62a, 63a of the first and second cam members 62, 63 from each other. However, in this embodiment, since the depth D1 of the first cam grooves 74 in the first cam member 62 is set to be larger than the radius of the cam ball 64 (refer to FIGS. 3 and 7A), the centrifugal force acting on the cam balls 64 can be received by wall surfaces of the first cam grooves 74 which are deeper, whereby the generation of loads for separating the confronting surfaces 62a, 63a of the first and second cam members 62, 63 can be restrained to a minimum level, thereby the generation of unwanted drag torque in the multi-plate clutch C being able to be prevented, contributing to the reduction in running resistance, as well as fuel consumption.

In contrast, when the first and second cam members 62, 63 rotate relatively in the directions indicated by the arrows B in FIG. 7B with the cam ball 64 coming into abutment with the stopper portions 74b, 75b of the first and second cam grooves 74, 75, since the attempt of the cam ball 64 to ride over the stopper portions 74a, 75a is blocked by the projections 62b, 63b, the cam ball 64 can prevented from riding over the stopper portions 74a, 75a to bring the multi-plate clutch C into unnecessary engagement.

Thus, while the embodiment of the invention has been described in detail heretofore, the invention may be modified variously without departing from the spirit and scope of the invention.

For example, while the torque cam mechanism 61 according to the embodiment is constructed to generate the axial thrust forces only when the first and second cam members 62, 63 rotate relatively in one direction, according to the first aspect of the invention, the stopper portions 74a, 75a are deleted whereas cam portions 74a, 75a are provided on both sides of the cam ball 64 in a circumferential direction, whereby axial thrust forces can be generated even though the first and second cam members 62, 64 rotate relatively in either of the directions.

In addition, while the depth of the first cam grooves 74 in the, first cam member 62 is made to be deeper whereas the depth of the second cam grooves 75 in the second cam member 63 is made to be shallower, the depth relationship may be reversed. Thus, in the event that the depth relationship between the first and second cam grooves 74, 75 is set to be opposite to that of the embodiment, the following additional advantage can be attained.

Since the second cam member 63 is spline connected to the clutch hub 42, which is, in turn, spline connected to the output shaft 9, the support rigidity of the second cam member 63 becomes comparatively high. In contrast, since the first cam member 62 is supported only by being held between the cam balls 64 . . . and the thrust bearing 72, the support rigidity thereof becomes lower than the support rigidity of the second cam member 63. Consequently, it is advantageous that the centrifugal force acting on the cam balls 64 . . . be received by the second cam member 63 which is high in support rigidity and difficult to be moved.

In addition, while the torque cam mechanism 61 is applied to the multi-plate clutch C in the embodiment, a torque cam mechanism as set forth in the first and second aspect of the invention may be applied to any other applications.

As has been described heretofore, according to the first aspect of the invention, since the depth of one of the first and second cam grooves is made to be larger than the radius of the cam ball, while the depth of the other is made to be smaller than the radius of the cam ball, even though the cam balls rotate together with the first and second cam members, a centrifugal force generated can be received by the deeper cam groove of the first and second cam members to thereby restrain the generation of thrust forces for separating the confronting surfaces of the first and second cam members from each other.

According to the second aspect of the invention, since the projections are formed on the confronting surface of the first cam member in such a manner as to cooperate, respectively, with the stopper portions in the first cam grooves and the projections are formed on the confronting surface of the second cam member in such a manner as to cooperate, respectively, with the stoppers in the second cam grooves, when the first and second cam members rotate relatively in the other direction such that the cam balls are brought into abutment with the stopper portions in the first and second cam groove the occurrence of a case where the cam balls ride on the stopper portions in the first and second cam grooves can securely be prevented by the action of the projections on both the confronting surfaces.

According to the third aspect of the invention, in the event that the rotating speed of the front wheels exceeds the rotating speed of the rear wheels when the vehicle runs forward, since thrust forces generated by the relative rotation of the first and second cam members of the torque cam mechanism immediately brings the multi-plate clutch into engagement, the response with which the vehicle is put in a four-wheel drive condition can be increased by transmitting the driving force from the front wheels to the rear wheels immediately the front wheels slip to generate the difference in rotation between the front and rear wheels when the vehicle starts to move forward from a standstill or is drastically accelerated while moving forward. Thereafter, since the multi-plate clutch is also brought into engagement by hydraulic pressures generated by the hydraulic pumps with a slight time-lag, a sufficient amount of driving force that is transmitted from the front wheels to the rear wheels can be secured. In contrast, in the event that the rotating speed of the rear wheels exceeds the rotating speed of the front wheels by panic braking when the vehicle is moving forward, since the torque cam mechanism generates no thrust force, any interference with the ABS mechanism can be avoided by preventing the transmission of the driving force from the front wheels to the rear wheels. Moreover, since the generation of thrust forces for separating the first and second cam members from each other by the centrifugal force applied to the cam balls can be restrained to a minimum level by the torque cam mechanism in which the depths of the first and second cam grooves are different, whereby the generation of unwanted drag torque in the multi-plate clutch can be prevented. Thus, the construction can contribute to the reduction in running resistance, as well as fuel consumption.

What is claimed is:

1. A torque cam mechanism comprising:

first and second cam members disposed relatively rotatably around a common axis and having first and second cam grooves respectively formed in confronting surfaces of said first and second cam members which confront each other; and cam balls adapted to fit in said both first and second cam grooves of said first and second cam members, wherein said first and second cam grooves respectively include cam portions for permitting the movement of said cam balls in circumferential directions, whereby when said first and second cam members rotate relative to each other, said cam balls ride on said cam portions of said first and second cam grooves to thereby generate axial thrust forces for separating both said confronting surfaces from each other, wherein the depth of one of first and second cam grooves is larger than the radius of said cam ball, while the depth of the other is smaller than the radius of said cam ball, wherein said first and second cam grooves further include, respectively, stopper portions for restraining the movement of said cam ball in a circumferential direction, whereby when said first and second cam members rotate relative to in one direction said cam balls ride on said cam portions of said first and second cam grooves to thereby generate axial thrust forces for separating both said confronting surfaces from each other, while when first and second cam members rotate relatively in the other direction said cam balls are locked at said stopper portions of said first and second cam grooves to thereby restrain said relative rotation in the other direction, and wherein said first cam member includes with projections which project from the confronting surface in such a manner as to cooperate, respectively, with said stopper portions of said first cam grooves, while said second cam member includes projections which project from the confronting surface in such a manner as to cooperate, respectively, with said stopper portions of said second cam grooves.

2. The torque cam mechanism as set forth in claim 1, wherein each of said stopper portions of said first and second cam grooves is formed in a partially spherical shape, which defines the depth, and wherein each of said cam portions of said first and second cam grooves extends circumferentially from said stopper portion so that the depth thereof get gradually shallower.

3. A power transmission system for a four-wheel drive vehicle comprising:

an input shaft to which the driving force of an engine to be directly transmitted to front wheel is input;

an output shaft transmitting part of the driving force of said engine to rear wheels;

a multi-plate clutch governing the transmission and cutoff of the driving force of said engine between the input shaft and the output shaft; and a torque cam mechanism as set forth in claim 1, wherein said multi-plate clutch engages by virtue of hydraulic pressures generated by hydraulic pumps according to a difference in rotation between said front wheels and said rear wheels, as well as by thrust forces generated by said torque cam mechanism according to a difference in rotation between said front and said rear wheels.

4. A power transmission system for a four-wheel drive vehicle comprising:

an input shaft to which the driving force of an engine to be directly transmitted to front wheel is input;

an output shaft transmitting part of the driving force of said engine to rear wheels;

a multi-plate clutch governing the transmission and cutoff of the driving force of said engine between the input shaft and the output shaft; and a torque cam mechanism as set forth in claim 2, wherein said multi-plate clutch engages by virtue of hydraulic pressures generated by hydraulic pumps according to a difference in rotation between said front wheels and said rear wheels, as well as by thrust forces generated by said torque cam mechanism according to a difference in rotation between said front and said rear wheels.

5. The power transmission system for a four-wheel drive vehicle comprising:

the torque cam mechanism as set forth in claim 2, wherein a thrust force generated in the torque cam mechanism is reduced as the oil pressure increases.

* * * * *